United States Patent
Nishizono et al.

(10) Patent No.: US 10,254,737 B2
(45) Date of Patent: Apr. 9, 2019

(54) MOTOR DRIVING APPARATUS

(71) Applicant: Panasonic Intellectual Property Management Co., Ltd., Osaka (JP)

(72) Inventors: Masaru Nishizono, Osaka (JP); Yoshiaki Ikeuchi, Nara (JP); Tomohisa Hirakawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/035,455

(22) PCT Filed: Dec. 9, 2014

(86) PCT No.: PCT/JP2014/006129
§ 371 (c)(1),
(2) Date: May 9, 2016

(87) PCT Pub. No.: WO2015/087540
PCT Pub. Date: Jun. 18, 2015

(65) Prior Publication Data
US 2016/0282835 A1    Sep. 29, 2016

(30) Foreign Application Priority Data
Dec. 12, 2013  (JP) .................................. 2013-256767

(51) Int. Cl.
*G05B 19/18*  (2006.01)
*G05B 19/19*  (2006.01)
(Continued)

(52) U.S. Cl.
CPC .............. *G05B 19/19* (2013.01); *H02P 31/00* (2013.01); *G05B 19/408* (2013.01); *G05B 19/416* (2013.01)

(58) Field of Classification Search
CPC .... G05B 19/408; G05B 19/416; G05B 19/19; G05B 2219/43194; G05B 19/231
(Continued)

(56) References Cited
U.S. PATENT DOCUMENTS 4,618,954 A * 10/1986 Otobe .................... G01D 21/00
                                                         714/45
6,102,963 A *  8/2000 Agrawal .......... H03K 19/17704
                                                        365/185.33
(Continued)

FOREIGN PATENT DOCUMENTS

CN          1543055 A        11/2004
JP          63-015697         1/1988
(Continued)

OTHER PUBLICATIONS

International Search Report of PCT application No. PCT/JP2014/006129 dated Mar. 3, 2015.
(Continued)

*Primary Examiner* — Kawing Chan
*Assistant Examiner* — Bradley Brown
(74) *Attorney, Agent, or Firm* — McDermott Will & Emery LLP

(57) ABSTRACT

A motor-driving apparatus, which drives a motor while controlling the motor based on an external command signal from an external device, includes an external command processor, a program storage, a motor controller, a program rewriting unit, a rewriting data input terminal. The external command processor outputs a motor control command from the external command signal based on an external command processing program. The motor controller controls an operation of the motor according to the motor control command based on a motor control program. Further, the external command processing program and the motor control pro-
(Continued)

gram are previously stored in the program storage. The program rewriting unit rewrites only the external command processing program stored in the program storage based on the program rewriting data received from the rewriting data input terminal.

5 Claims, 5 Drawing Sheets

(51) Int. Cl.
  *H02P 31/00* (2006.01)
  *G05B 19/416* (2006.01)
  *G05B 19/408* (2006.01)

(58) Field of Classification Search
  USPC ........................................................ 318/569
  See application file for complete search history.

(56) References Cited

U.S. PATENT DOCUMENTS

| 6,335,870 | B1 | 1/2002 | Sakurai | |
|---|---|---|---|---|
| 2003/0182016 | A1 | 9/2003 | Fiebig et al. | |
| 2003/0217226 | A1* | 11/2003 | Makita | G06F 3/0607 |
| | | | | 711/115 |
| 2004/0217721 | A1 | 11/2004 | Brotto | |
| 2005/0093501 | A1 | 5/2005 | Takahashi et al. | |
| 2007/0108932 | A1 | 5/2007 | Takahashi et al. | |
| 2007/0174622 | A1* | 7/2007 | Romain | G06F 21/52 |
| | | | | 713/176 |
| 2009/0144834 | A1* | 6/2009 | Mochizuki | G11C 16/22 |
| | | | | 726/27 |
| 2014/0122903 | A1* | 5/2014 | Endo | G06F 21/602 |
| | | | | 713/193 |

FOREIGN PATENT DOCUMENTS

| JP | 11-280536 | 10/1999 |
|---|---|---|
| JP | 2003-305668 | 10/2003 |
| JP | 2004-336993 | 11/2004 |
| JP | 2005-168282 | 6/2005 |
| JP | 2008-172896 | 7/2008 |
| JP | 2008-263678 | 10/2008 |
| JP | 2008263678 A * | 10/2008 |
| WO | 1999/034515 A1 | 7/1999 |
| WO | 2000/004629 | 1/2000 |

OTHER PUBLICATIONS

The Extended European Search Report dated Nov. 22, 2016 for the related European Patent Application No. 14869419.3.
The English Translation of Chinese Search Report dated Jan. 10, 2018 for the related European Patent Application No. 201480067208.3.

* cited by examiner

MOTOR DRIVING APPARATUS

This application is a U.S. national stage application of the PCT international application No. PCT/JP2014/006129 filed on Dec. 9, 2014, which claims the benefit of foreign priority of Japanese patent application No. 2013-256767 filed on Dec. 12, 2013, the contents all of which are incorporated herein by reference.

TECHNICAL FIELD

The present invention relates to a motor-driving apparatus for driving a motor while controlling the motor based on a command from an external device.

BACKGROUND ART

Motor control is the processing of controlling a position and velocity of a motor according to a position command and a speed command. For such motor control, various kinds of control methods have been proposed to achieve performance improvement.

On the other hand, the motor-driving apparatus is needed, in addition to such motor control, to perform connection to external devices or the like. For instance, in the case where a motor-driving apparatus is connected to external devices with a network, an amount of data to be processed is enlarged as speed of the network is increased in recent years. In addition to this, the motor-driving apparatus is necessary to deal with complicated operation commands. Accordingly, a network part of the motor-driving apparatus is required to perform significantly increasing processes. Further, various types of networks are available in a market. Thus, motor manufacturers are needed to adapt their network part to a plurality of networks depending on customer's requirements. However, if the motor manufacturers develop the network part individually, an enormous amount of man-hours will be necessary disadvantageously. Further, if entrusting external experts with the task of developing the network part, motor manufacturers each are necessary to disclose the entire control part, which is a mass of their know-how, to the external experts. This makes it disadvantageously difficult to entrust external experts.

Therefore, a technique for adapting to a network efficiently has been proposed.

For instance, a CPU board for connection to a host controller is separately provided in a motor-driving apparatus to perform analysis processing of serial communication data. To control a motor, data is transmitted and received between the CPU board and a servo board for performing motor control in another communication form. By doing so, even if a type of network connected to the controller is changed, it is only necessary to modify processing of the CPU board for connection to the host controller. Furthermore, the corresponding man-hours can be reduced significantly because there is little influence on a motor control part. Alternatively, even if entrusting external experts, motor manufacturers are not necessary to disclose motor control processing, so that the development can be entrusted in low-risk (e.g., see Patent Document 1).

For this application, with respect to a standard motor-driving apparatus, an externally attachable product is available in a market as an external option board. If a model is prepared to adapt the external option board to various types of networks, only replacement of the external option board makes it possible to adapt to various types of networks. Further, the motor control part and the network part are completely separated. Therefore, motor manufacturers are allowed to entrust external experts with the task of developing a motor-driving apparatus adaptable to various types of networks without disclosing their know-how in associated with motor control.

However, the conventional technique, described above, requires additional hardware such as a dedicated CPU board or an option board, which causes disadvantages such as a large size and a high cost.

CITATION LIST

Patent Literature

PTL 1: Unexamined Japanese Patent Publication No. 2008-263678

SUMMARY

A motor-driving apparatus of the present invention is a motor driving apparatus for driving a motor while controlling the motor based on an external command signal from an external device. The motor driving apparatus includes an external command processor for receiving an external command signal and outputting a motor control command from the external command signal based on an external command processing program, and a motor controller for receiving the motor control command and controlling an operation of the motor according to the motor control command based on a motor control program. Further, the motor driving apparatus includes a program storage for storing the external command processing program and the motor control program in advance as storage program data, a program rewriting unit for rewriting the storage program data stored in the program storage, and a rewriting data input terminal for receiving a program rewriting data to be rewritten by the program rewriting unit from the outside. Further, the program rewriting unit is configured to rewrite only the external command processing program stored in the program storage based on the program rewriting data received from the rewriting data input terminal.

According to the motor driving apparatus of the present invention, only the external command processing program is made rewritable, so that the motor driving apparatus can be adapted to various types of communication systems in which external command signals are transmitted without adding any hardware. Furthermore, the external command processor and the motor controller each output monitoring data and a program monitor detects abnormal conditions. By adding such a function, a more highly reliable motor driving apparatus can be proposed.

DESCRIPTION OF PREFERRED EMBODIMENTS

Hereinafter, embodiments of the present invention will be described with reference to the drawings.

First Exemplary Embodiment

Figure 1:
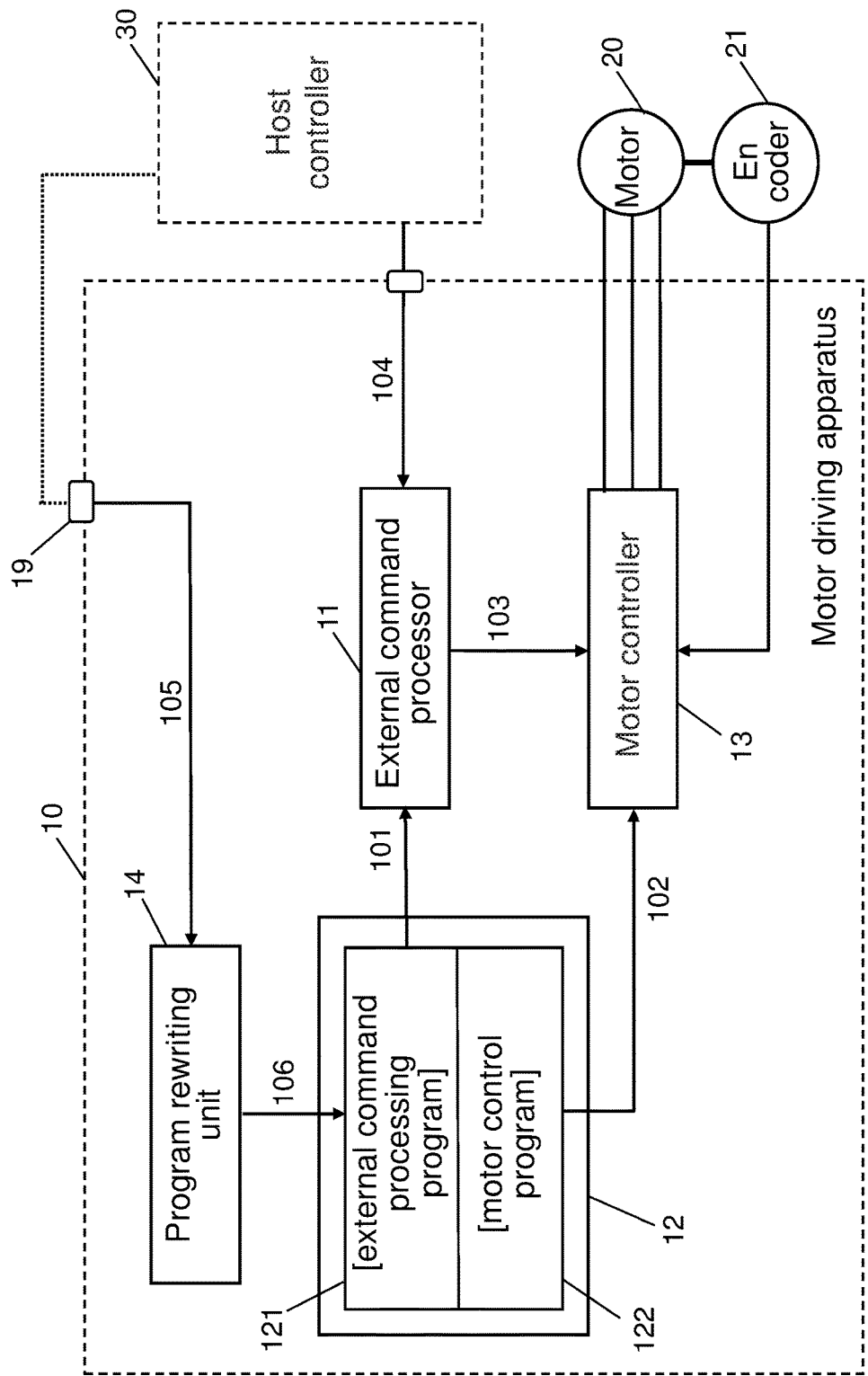
FIG. 1 is a block diagram showing a motor driving apparatus in a first exemplary embodiment of the present invention.

FIG. 1 is a block diagram showing a motor driving apparatus in a first exemplary embodiment of the present invention. FIG. 1 shows an exemplary configuration of a motor control system including motor driving apparatus 10 of the present embodiment.

In FIG. 1, while being controlled by host controller 30 serving as an external device installed outside, motor driving apparatus 10 controls motor 20 to drive motor 20 at a predetermined position and velocity, according to the control of host controller 30.

Motor driving apparatus 10 includes external command processor 11, program storage 12, motor controller 13, program rewriting unit 14, and rewriting data input terminal 19, as shown in FIG. 1.

Host controller 30 notifies such motor driving apparatus 10 of external command signal 104 that indicates various commands with respect to motor driving apparatus 10. External command signal 104 is supplied to external command processor 11. External command processor 11 produces motor control command 103 for controlling motor 20, which serves as various commands with respect to motor 20, from external command signal 104 based on external command processing program 101. And then, external command processor 11 outputs motor control command 103, produced above, to motor controller 13.

Motor control unit 13 controls a position and speed of motor 20 according to motor control command 103 supplied from external command processor 11 based on motor control program 102. For instance, position feedback, which uses encoder 21, is employed to control the position and speed. Herein, motor 20 is constituted by, for example, a stator having a winding wire and a mover having a permanent magnet. When the winding wire is energized by motor driving apparatus 10, the mover rotates. In the case of a linear motor, the mover moves linearly. Encoder 21 is a position detector equipped with motor 20 and detects a position of the mover. Information on the position detected by the encoder 21 is announced to motor controller 13 as a position detection signal. For instance, as an example of the control performed by motor controller 13, when performing position control, motor controller 13 carries out position feedback control such that the position detected by encoder 21 is matched with a position indicated by a position command included in motor control command 103 produced from external command signal 104.

Further, program storage 12 previously stores external command processing program 101 for operating external command processor 11 and motor control program 102 for operating motor controller 13 in a data format of storage program data. FIG. 1 shows, as an example, that external command processing program 101 is stored in external command processing program storage area 121 and motor control program 102 is stored in motor control program storage area 122.

Motor driving apparatus 10 of the present embodiment further includes rewriting data input terminal 19 and program rewriting unit 14. Program rewriting unit 14 is provided to rewrite the storage program data stored in program storage 12. Rewriting data input terminal 19 is further provided to receive program rewriting data 105 to be rewritten by program rewriting unit 14 from the outside. FIG. 1 shows, as an example, that program rewriting data 105 is supplied from host controller 30 and program rewriting unit 14 receives program rewriting data 105 via rewriting data input terminal 19. Note that, program rewriting data 105 may be supplied from another device for producing program rewriting data 105, rather than host controller 30.

Especially, in the exemplary embodiment, program rewriting unit 14 rewrites only external command processing program storage area 121 with program rewriting data 105 received form host controller 30 or the like via rewriting data input terminal 19. Herein, external command processing program storage area 121 corresponds to an area of command processing program 101 stored in program storage 12. That is, for example, if the operation of external command processor 11 is necessary to be modified or updated, program rewriting unit 14 overwrites external command processing program storage area 121 with the received program rewriting data 105 to update or revise external command processing program 101. Alternatively, program rewriting unit 14 may erase external command processing program storage area 121 once, and then newly write program rewriting data 105 received via rewriting data input terminal 19 into the erased area. Herein, program rewriting data 105 received via rewriting data input terminal 19 is a data string serving as external command processing program 101 to be newly rewritten. Further, when program rewriting data 105 is transmitted from host controller 30 to program rewriting unit 14, the data string serving as external command processing program 101 to be rewritten may be transmitted. Further, program rewriting data 105 may be transmitted using a communication technique such as a serial communication or high-speed communication, for example.

Further, although described in detail below, the exemplary embodiment is prohibited from rewriting motor control program 102, contrary to external command processing program 101. That is, motor control program storage area 122 is a non-writable area.

Next, motor driving apparatus 10 of the present embodiment configured as described above will be described in detail.

External command processor 11 is constituted by hardware including a microcomputer or a Digital Signal Processor (DSP). When the microcomputer or the like is operated according to external command processing program 101 stored in program storage 12, various types of processing included in external command processor 11 are executed. For instance, external command processor 11 receives external command signal 104 from host controller 30 by using hardware such as a flip-flop or a shift register. External command processor 11 analyzes external command signal 104 according to external command processing program 101 serving as software, and produces motor control command 103 to be supplied to motor controller 13.

External command signal 104 is transmitted by using High and Low (H,L) signal such as AB-phase pulse command input or I/O input, general-purpose serial communications such as RS232, or Ether-Net (registered trademark)-based high-speed communication. Further, in external command signal 104, information on various commands is stored as data based on a format defined by the communication system. From such external command signal 104, external command processor 11 extracts data regarding the commands stored in the signal, and produces motor control command 103 to be supplied to motor controller 13 from the extracted data. Thus, such above processing is executed according to external command processing program 101.

Motor control command 103 means a command that is required for motor control such as a target position, a position command, a speed command, and a torque command. If a data format of motor control command 103 is fixed, motor controller 13 is adaptable without changing its processing even when an external command, which external command processor 11 is adaptable to, is changed (e.g., change in a network type or a communication method). Even if a network type or a communication system is changed, it is only necessary to rewrite external command processing program 10, which includes a processing program for extracting program command data.

Further, motor controller 13 is also constituted by hardware including a microcomputer or DSP. The microcomputer or the like is operated according to motor control program 102 stored in program storage and performs various types of processing for controlling motor 20. Motor controller 13 further includes hardware such as an Insulated Gate Bipolar Transistors (IGBT) or a photo-coupler, which constitutes an inverter that is required to drive motor 20. To drive motor 20 according to motor control command 103 based on motor control program 102, motor controller 13 feeds back position information from encoder 21 and performs position control, speed control, torque control, current control, and the like. Especially, as mentioned above, the data format of motor control command 103 is fixed. Thus, there is no need to modify motor control program 102 depending on the change in a communication system, although external command processing program 101 needs such modification.

Next, program storage 12 is a memory such as a flash memory for storing programs, and rewritable from the outside. That is, in the exemplary embodiment, program storage 12 may be a rewritable nonvolatile semiconductor memory like a flash memory, which is allowed to be rewritten by only an electrical operation. The memory stores external command processing program 101 and motor control program 102 whose areas are separated from each other. Motor control program 102 is written in advance, and program rewriting unit 14 is prohibited from rewriting motor control program 102. On the other hand, external command processing program 101 may be written in advance, but after being written, external command processing program 101 is allowed to be rewritten optionally. Further, external command processing program 101 may be stored in a flash memory, and motor control program 102 may be stored in a non-rewritable Read Only Memory (ROM).

Figure 2:
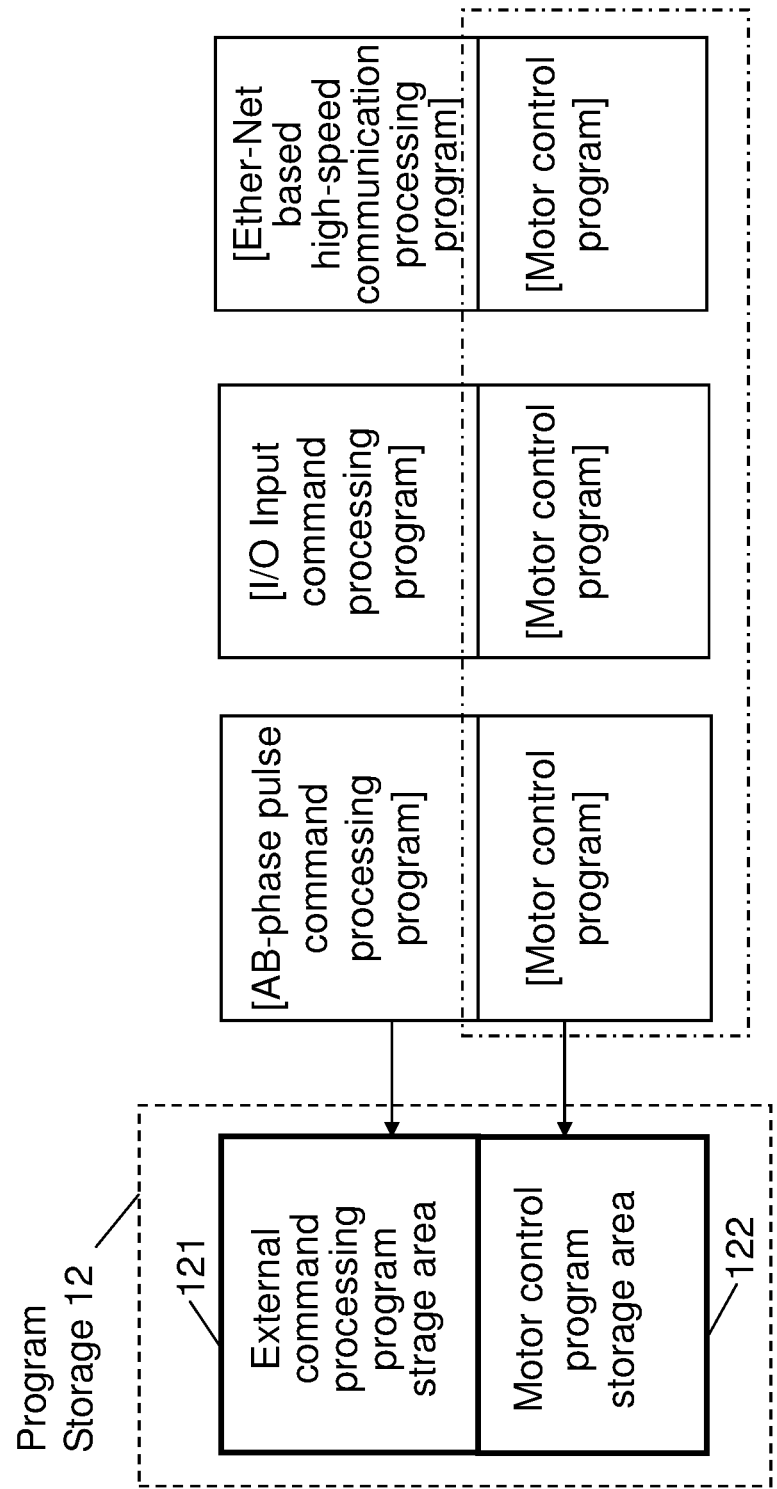
FIG. 2 is a view showing examples corresponding to various types of external commands in the first exemplary embodiment of the present invention.

Next, program rewriting unit 14 also includes a microcomputer or DST and additionally includes hardware that can receive program rewriting data 105 from host controller 30. The transmission of program rewriting data 105 from the host controller 30 is typically performed by using a general purpose serial communication such as RS232, Ether-Net (registered trademark) based high-speed communication, or the like. As described above, program rewriting data 105 corresponds to external command processing program 101 to be newly rewritten. Program rewriting unit 14 outputs the received program rewriting data 105 as program rewriting data 106, and rewrites only external command processing program area 121 in program storage 12. FIG. 2 is a diagram showing examples corresponding to such various types of external command signals 104. If external command signal 104 is a pulse command as shown in FIG. 2, AB-phase pulse command processing program is stored in external command processing program area 121. Further, similarly, if external command signal 104 is an I/O input, an I/O input command processing program is stored in external command processing program area 121. If external command signal 104 is Ether-Net (registered trademark) based high-speed communication, Ether-Net (registered trademark) based high-speed communication processing program is stored in external command processing program area 121. On the other hand, motor control program 102 is stored in motor control program storage area 122 in each case.

Note that, the processes of external command processor 11, motor controller 13, and program rewriting unit 14 may be performed in parallel by using a single microcomputer or DSP.

In the exemplary embodiment, programs included in motor driving apparatus 10 are divided into two parts, i.e., external command processing program 101 to be executed in external command processor 11 and motor control program 102 to be executed in motor controller 13. Further, only external command processing program 101 is allowed to optionally be rewritten by program rewriting unit 14. Accordingly, even if the type of external command signal 104 from the host controller 30 is changed, it is only necessary to develop external command processing program 101 separately and write it into motor driving apparatus 10 as a program. This makes it easy to adapt to the change. Further, the above modification can be achieved while remaining a configuration required for a normal motor drive device, thereby eliminating the need for substantially added hardware such as a newly added CPU board or option board.

Furthermore, a format of motor control command 103 is fixed. External command processor 11 is configured to constantly output commands to motor controller 13 according to the format. With such a configuration, as shown in FIG. 2, even if the type of external command signal 104 is changed, there is no need to change programs in motor controller 13. This makes it possible to develop only external command processing program 101 independently without disclosing motor control program 102 to external experts, thereby preventing an outflow of expertise about the motor control.

Note that, the transmission of motor control command 103 from external command processor 11 to motor controller 13 is performed through a shared RAM or by using a general-purpose communication such as serial communication. Since RAM is usually built in a microcomputer, the built-in RAM may partially be used for the transmission.

Second Exemplary Embodiment

Figure 3:
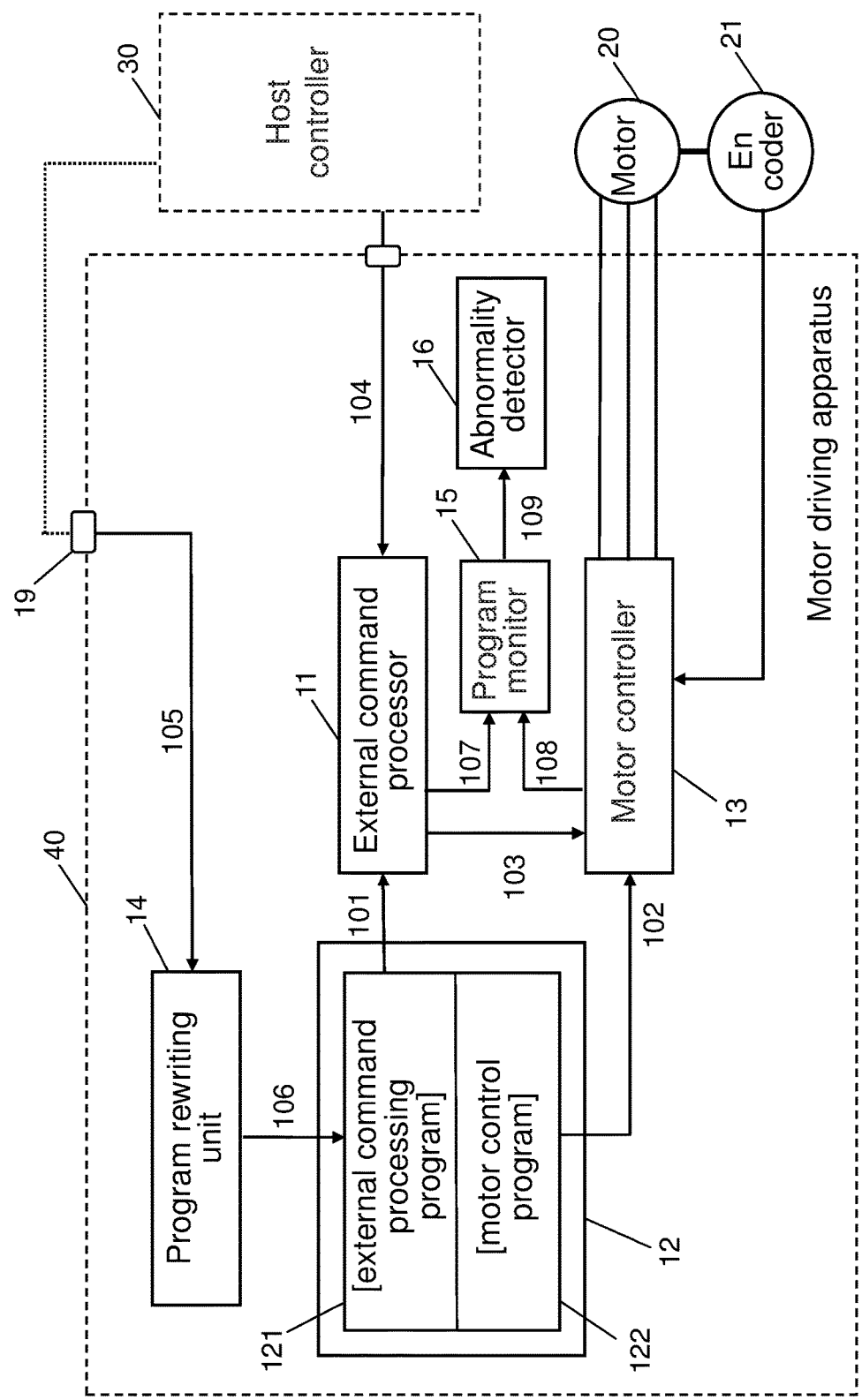
FIG. 3 is a block diagram showing a motor driving apparatus in a second exemplary embodiment of the present invention.

FIG. 3 is a block diagram showing motor drive device 40 in a second exemplary embodiment of the present invention. Since a fundamental structure is the same as that of the first exemplary embodiment, the difference between them will mainly be described.

In addition to the configuration of the first exemplary embodiment, the exemplary embodiment further includes program monitor 15 for monitoring an abnormality of external command processing program 101 and outputting abnormality detection signal 109 indicating abnormality detection, and abnormality detector 16 for performing abnormality processing based on abnormality detection signal 109. Further, external command processor 11 outputs first monitoring data 107 that is produced based on external command processing program 101, and motor controller 13 outputs second monitoring data 108 that is produced based on motor control program 102. Program monitor 15 outputs abnormality detection signal 109 from first monitoring data 107 and second monitoring data 108. Abnormality detector 16 receives abnormality detection signal 109 and performs the abnormality processing. Especially, to monitor the abnormality of external command processing program 101, program monitor 15 compares first monitoring data 107 and second monitoring data 108.

Furthermore, the exemplary embodiment uses a predetermined specific code to determine whether external command processing program 101 is normal or not. Specifically, a pre-designated specific code is previously stored in external command processing program 101. The code is an individual code assigned to each external expert. The external expert writes the assigned code into external command processing program 101 that has been developed. All of codes determined for each expert are written into motor control program 102 in advance. External command processor 11 outputs the stored specific code as first monitoring data 107. Likewise, motor controller 13 also outputs all of the stored specific codes as second monitoring data 108. If the specific code of first monitoring data 107 is included in a list of the specific codes of second monitoring data 108, program monitor 15 determines that external command processing program 101 is normal. If not included, program monitor 15 determines that external command processing program 101 is abnormal, and then outputs abnormality detection signal 109. When receiving abnormality detection signal 109, abnormality detector 16 performs abnormality processing such as an error indication or motor driving prohibition processing. Thus, if unauthorized external experts develop external command processing program 101 and use it, any abnormality will be detected. Therefore, a highly reliable motor drive apparatus can be proposed.

Third Exemplary Embodiment

Figure 4:
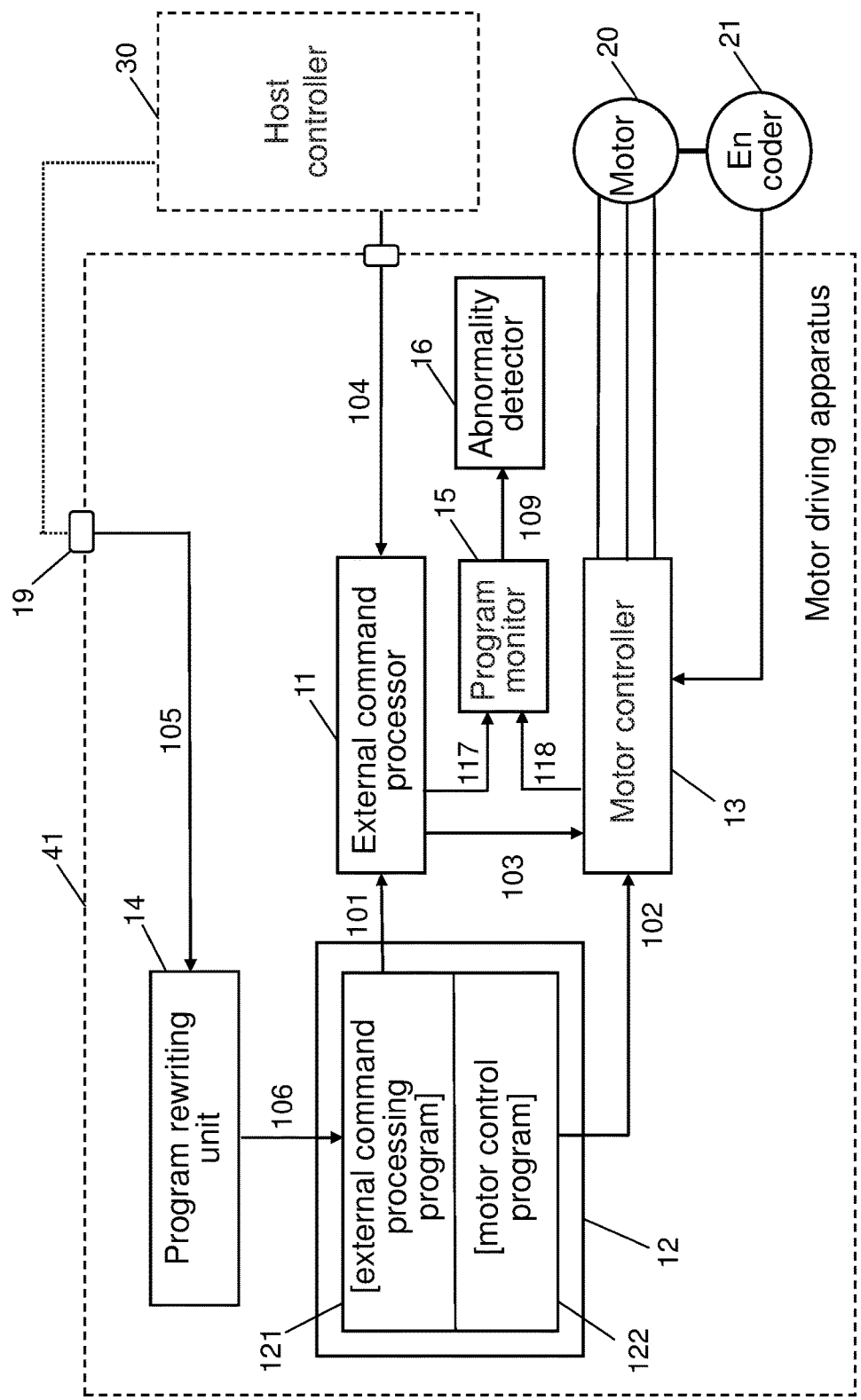
FIG. 4 is a block diagram showing a motor driving apparatus in a third exemplary embodiment of the present invention.

FIG. 4 is a block diagram showing motor driving apparatus 41 in a third exemplary embodiment of the present invention. Since a fundamental structure is the same as that of the second exemplary embodiment, the difference between them will mainly be described.

Like the second exemplary embodiment, the present exemplary embodiment includes program monitor 15 for monitoring an abnormality of external command processing program 101, and abnormality detector 16 for performing abnormality processing based on anomaly detection signal 109.

Further, in the present exemplary embodiment, external command processor 11 outputs first monitoring data 117, and motor controller 13 outputs second monitoring data 118. Thus, the present exemplary embodiment differs from the second exemplary embodiment in data used as monitoring data, i.e., uses a checksum value. External command processor 11 calculates a checksum value over the entire area of external command processing program 101, and outputs the value as first monitoring data 117. Motor controller 13 stores a checksum value previously calculated over the entire area of external command processing program 101 in motor control program 102, and then outputs the checksum value as second monitoring data 118. If first monitoring data 117 and the second monitoring data 118 are matched, program monitor 15 determines that external command processing program 101 is "normal." If not matched, program monitor 15 determines that external command processing program 101 is "abnormal," and outputs abnormality detection signal 109. Accordingly, if unexpected external command processing program 101 viewed from motor controller 13 is written, any abnormality will be detected. This makes it possible to propose a highly reliable motor driving apparatus. Further, by adopting such a rule that a checksum value of external command processing program 101 is written into motor control program 102, a combination with external command processing program 101 developed by unauthorized external experts is eliminated.

Fourth Exemplary Embodiment

Figure 5:
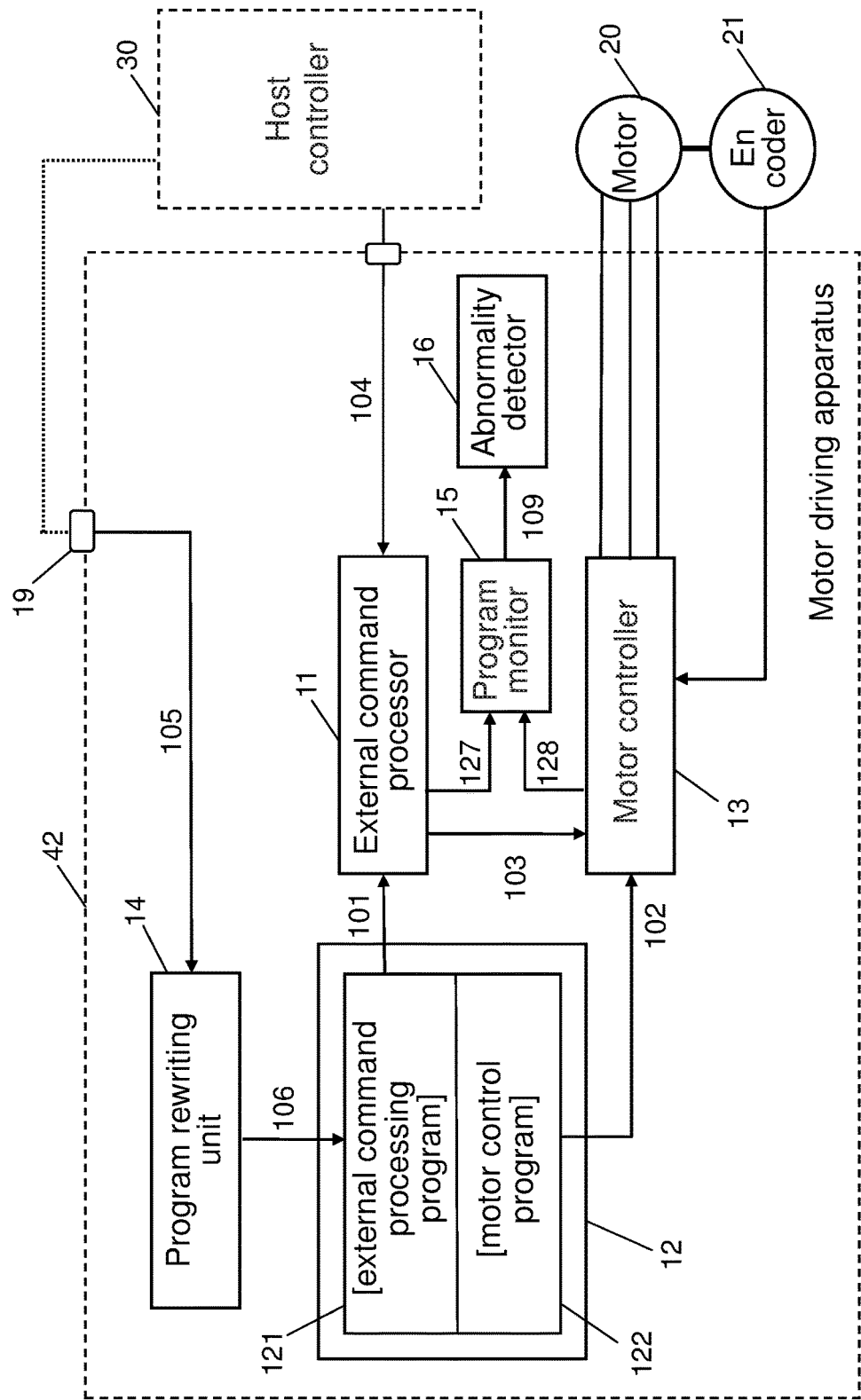
FIG. 5 is a block diagram showing a motor driving apparatus in a fourth exemplary embodiment of the present invention.

FIG. 5 is a block diagram showing a motor driving apparatus 42 in accordance with a fourth exemplary embodiment of the present invention. Since a fundamental structure is the same as that of the second and third exemplary embodiments, the difference between them will mainly be described.

Like the second and third exemplary embodiments, the present exemplary embodiment includes program monitor 15 for monitoring an abnormality of external command processing program 101, and abnormality detector 16 for performing abnormality processing based on abnormality detection signal 109.

Furthermore, in the present exemplary embodiment, external command processor 11 outputs first monitoring data 127, and motor controller 13 outputs second monitoring data 128. Thus, the present exemplary embodiment differs from the second and third exemplary embodiments in data used as monitoring data, i.e., uses processing time. External command processor 11 constantly measures its own processing time and outputs the processing time at each given as first monitoring data 127. From processing time required for motor control, motor controller 13 previously determines the maximum value of processing time acceptable for external command processor 11 and outputs the value as second monitor data 128. If first monitoring data 127 exceeds second monitoring data 128, program monitor 15 determines that external command processing program 101 is abnormal, and outputs abnormality detection signal 109. Thus, if the processing time of external command processing program 101 exceeds the expected time viewed from motor controller 13, any abnormality will be detected, thereby preventing unexpected operation trouble due to lack of processing time. This makes it possible to propose a highly reliable motor driving apparatus.

As described above, the present invention is configured to make only an external command processing program modifiable. This makes it possible to adapt to various types of external commands (I/O, pulse commands, networks, or the like) easily. Especially, development by using external experts is advantageously performed at a low risk.

On the other hand, its flexibility is high, so it is supposed that unauthorized external experts are allowed to develop an external command processing program independently. Accordingly, as shown in the second, third, and fourth exemplary embodiments, if a function for monitoring programs is added according to a predetermined rule, unauthorized external command processing programs will be eliminated. This makes it possible to propose a more highly reliable motor driving apparatus.

Further, to enable customization by a user, a portion of the external command processing program may be replaced with a program having another role. Depending on the way how to make a program, the motor driving apparatus is made more suitable for every apparatus properties such as switching a gain of motor control, or operating at a special operation pattern.

INDUSTRIAL APPLICABILITY

A motor driving apparatus of the present invention is useful for a servo motor control which is needed to adapt to various types of external commands, or other control devices of a linear motor or the like.

The invention claimed is:

1. A motor driving apparatus for driving a motor while controlling the motor based on an external command signal from an external device, the motor driving apparatus comprising:
   an external command processor for receiving the external command signal and outputting a motor control command from the external command signal based on an external command processing program;
   a motor controller for receiving the motor control command and controlling an operation of the motor according to the motor control command based on a motor control program;
   a program storage being a nonvolatile semiconductor memory for storing the external command processing program and the motor control program in advance as storage program data, wherein the external command processing program is stored in a rewritable external command processing program storage area and the motor control program is stored in a non-rewritable motor control program storage area;
   a program rewriting unit for rewriting the storage program data stored in the rewritable external command processing program storage area; and
   a rewriting data input terminal for receiving program rewriting data to be rewritten by the program rewriting unit,
   wherein the program rewriting unit rewrites only the external command processing program stored in the program storage based on the program rewriting data received from the rewriting data input terminal,
   wherein the program rewriting unit rewrites the external command processing program corresponded to different various external devices from which the external command processing program is received via the rewriting data input terminal, and
   wherein the motor is controlled by the motor control command that the external command processor generates from the external command signal based on the rewritten external command processing program.

2. The motor driving apparatus according to claim 1, further comprising:
   a program monitor for monitoring an abnormality of the external command processing program and outputting an abnormality detection signal that indicates abnormality detection; and
   an abnormality detector for performing abnormality processing based on the abnormality detection signal,
   wherein the external command processor outputs a first monitoring data that is produced based on the external command processing program,
   the motor controller outputs a second monitoring data that is produced based on the motor control program, and
   the program monitor monitors the abnormality of the external command processing program by comparing the first monitoring data and the second monitoring data.

3. The motor driving apparatus according to claim 2, wherein
   the first monitoring data is a specific code that is determined in advance and set in the external command processing program,
   the second monitoring data is a list of acceptable specific codes that are determined in advance and set in the motor control program, and
   when the specific code of the first monitoring data is not included in the list of the specific codes of the second monitoring data, the program monitor determines that the external command processing program is abnormal and outputs the abnormality detection signal.

4. The motor driving apparatus according to claim 2, wherein
   the first monitoring data is a checksum value that is calculated over all of the external command processing program by the external command processor,
   the second monitoring data is a checksum value that is calculated over all of the external command processing program in advance and stored in the motor control program, and
   when the first monitoring data and the second monitoring data are not matched, the program monitor determines that the external command processing program is abnormal and outputs the abnormality detection signal.

5. The motor driving apparatus according to claim 2, wherein
   the first monitoring data indicates processing time of the external command processor that is measured at each given time by the external command processor,
   the second monitoring data indicates a maximum value of acceptable processing time, and
   when the first monitoring data exceeds the second monitoring data, the program monitor determines that the external command processing program is abnormal and outputs the abnormality detection signal.

* * * * *